United States Patent [19]

Senda et al.

[11] 4,374,677

[45] Feb. 22, 1983

[54] PREPARATION OF IMPROVED HEAT STABLE YELLOW IRON OXIDE PIGMENTS

[75] Inventors: Jihei Senda; Yoshihiro Inoue; Toshiaki Uenishi, all of Ube; Hidefumi Harada, Yamaguchi; Kouji Nakata; Akio Akagi, both of Ube, all of Japan

[73] Assignee: Titan Kogyo K.K. Japan, Japan

[21] Appl. No.: 308,338

[22] Filed: Oct. 5, 1981

Related U.S. Application Data

[63] Continuation-in-part of Ser. No. 154,350, May 29, 1980, abandoned.

[30] Foreign Application Priority Data

May 20, 1979 [JP] Japan ................................. 54-66101

[51] Int. Cl.³ .......................... C01G 49/02; C09C 1/24
[52] U.S. Cl. .................................... 106/309; 106/304; 106/308 B; 423/633; 427/218
[58] Field of Search ................... 106/304, 308 B, 309; 423/633; 427/218

[56] References Cited

U.S. PATENT DOCUMENTS

| 3,382,174 | 5/1968 | Hund ................................. | 423/634 |
| 3,919,404 | 11/1975 | Beck ................................. | 423/633 |
| 3,946,103 | 3/1976 | Hund ................................. | 106/304 |
| 3,969,494 | 7/1976 | Nobuoka et al. ................. | 423/633 |
| 3,987,156 | 10/1976 | Nobuoka ........................... | 106/304 |
| 4,140,539 | 2/1979 | Hund et al. ........................ | 423/633 |

FOREIGN PATENT DOCUMENTS 53-102298 of 1978 Japan .
53-28158 of 1978 Japan .
53-34827 of 1978 Japan .

*Primary Examiner*—Mark Bell
*Attorney, Agent, or Firm*—George L. Rushton

[57] ABSTRACT

Yellow iron oxide pigments having improved heat stability are prepared by subjecting an alkaline slurry of conventional yellow iron oxide, a soluble ferric salt, and sodium aluminate to a hydrothermal (autoclave) treatment at 100°–240° C., separating and slurrying the resultant solid product, and subjecting that product to a second hydrothermal treatment of 250°–350° C. The original iron oxide has a heat stability (based on color change from yellow to red) temperature of about 203° C., while the final product shows a change at 270° C.

6 Claims, 4 Drawing Figures

PREPARATION OF IMPROVED HEAT STABLE YELLOW IRON OXIDE PIGMENTS

BACKGROUND OF THE INVENTION

This is a continuation-in-part of our co-pending application, Ser. No. 154,350, filed May 29, 1980, now abandoned.

The present invention relates to yellow iron oxide pigment. It further relates to a method for improving the heat resistance of yellow iron oxide pigment.

DESCRIPTION OF THE PRIOR ART

Yellow inorganic pigments, such as yellow iron oxide, chrome yellow, and cadmium yellow, and organic pigments, such as benzidine yellow, are well known. For applications where heat resistance is required, pigments other than yellow iron oxide have been used. However, chrome yellow and cadmium yellow contain materials harmful to the human body, and benzidine yellow exhibits a carcinogenic tendency, and, therefore, they are regulated for their production and use strictly by the Labor Security and Hygienic Law.

Thus, a non-toxic and heat stable, or heat resistant, pigment capable of being adopted in substitution for these noxious yellow pigments has been sought. In this regard, yellow iron oxide, which is not only non-toxic but also inexpensive, has had a history of practical use in certain application fields. However, since yellow iron oxide has a disadvantage that the heat stability is less than that of other yellow pigments, the range of its use as a substitute for the above-mentioned noxious pigments is restricted. Thus, an improved yellow iron oxide pigment showing better heat resistance has been awaited.

Previous experiments to improve the heat stability of yellow iron oxide produced a new yellow iron oxide pigment containing AlOOH in the form of a solid solution, such as (FeAl)OOH, which exhibited an improvement in heat resistance of about 50° C. as compared with that of conventional yellow iron oxide. This composition was obtained by introducing conventional yellow iron oxide into an aqueous solution of a ferric salt and adding thereto an alkali and an aluminum compound, followed by a hydrothermal treatment. This was the subject of our patent application (Patent Laying Open No. 102298/1978 in Japan, and Ser. No. 72,805 in the U.S.).

This AlOOH-containing yellow iron oxide, emphasized as a solid solution of [α-FeOOH-α-AlOOH] can be used as a substitute for the conventional noxious pigments in applications where it is exposed to relatively low temperatures, such as traffic paint and the like. However, it cannot find complete substitution for the conventional noxious pigments in applications requiring molding processing at a higher temperature, such as in the processing of polyethylene, polypropylene, ABS and so on, since it can undergo a discoloration similarly to the conventional yellow iron oxide pigment.

SUMMARY OF THE INVENTION

Further experiments have led to the discovery that the AlOOH-containing yellow iron oxide according to our former invention will retain its goethite crystal form even in water of a temperature higher than 250° C., i.e., the transition temperature at which goethite crystal is transformed into hematite, without causing decomposition. Thus, by conducting a hydrothermal treatment in hot water at a temperature of at least 250° C., the incomplete crystal of the AlOOH-containing yellow iron oxide formed on the surface of conventional yellow iron oxide is converted into a complete crystal, and, at the same time, the bond between the inner substrate of conventional yellow iron oxide and the superficial layer of the AlOOH-containing yellow iron oxide is strengthened, whereby the heat stability will further be increased.

According to the present invention, we can prepare a yellow iron oxide pigment in which the heat resistance is improved by about 100° C., compared with conventional yellow iron oxide. Thus it is now possible to use yellow iron oxide pigment in the application field requiring a molding processing at higher temperature, such as for compounding in polyethylene, polypropylene, ABS and so on.

The present invention comprises a method for improving the heat resistance of yellow iron oxide by
  (a) introducing conventional yellow iron oxide into an aqueous solution of a ferric salt,
  (b) adding thereto an aluminum compound and an alkali metal hydroxide
  (c) performing thereafter a hydrothermal treatment at a temperature within the range from 100° to 240° C., so as to cover the surface of the conventional yellow iron oxide particle by a layer of yellow iron oxide containing AlOOH, and
  (d) conducting a further hydrothermal treatment at a temperature of at least 250° C., to cause the completion of the crystal of superficial yellow iron oxide layer containing AlOOH in solid solution and, at the same time, to attain the strengthening of the bond between the substrate of conventional yellow iron oxide and the superficial layer of the AlOOH-containing yellow iron oxide.

When a yellow iron oxide subjected to a hydrothermal treatment in an aqueous solution of alkali at a temperature not higher than 250° C., as disclosed in the Japanese Patent Publication No. 28158/1978 or in the Japanese Patent Laying Open No. 34827/1978, is employed in the method according to the present invention for the substrate yellow iron oxide, the heat resistance can further be increased by the so-called addition effect, since the starting substrate iron oxide has already an increased heat resistance.

DETAILED DESCRIPTION OF PREFERRED EMBODIMENTS

Figure 1A:
FIGS. 1a and 1b show electron microscopic photographs, both in a magnification of X30,000, for the AlOOH-containing yellow iron oxide obtained by the method according to the present invention (FIG. 1a) and for the conventional yellow iron oxide used as the starting iron oxide (FIG. 1b) respectively.

When alkali is present in excess in the method according to the present invention, at least a portion of the AlOOH contained as solid solution in the superficial yellow iron oxide layer will be re-dissolved, and the surface of the substrate of conventional yellow iron oxide thus becomes exposed, causing a transformation of the conventional yellow iron oxide into α-iron oxide during the hydrothermal treatment. Therefore, in the case of excess alkali, it is necessary to reduce the alkali concentration to a degree lower than that in the hydrothermal treatment at 100°–250° C. before a second, higher temperature hydrothermal treatment is started.

The amount of alkali metal hydroxide used in the preparation of the invention can vary, depending on the other materials used. Alkali metal hydroxide means the hydroxide form of any of the alkali metals. The predominent alkali metal hydroxides are KOH and NaOH. NaOH, a convenient and commercially available compound, is a preferred alkali metal hydroxide. If the aluminum compound added to the slurry is, for example, aluminum sulfate, alkali addition is necessary, to a pH of at least 10, such as 12. If sodium aluminate is the aluminum compound used, additional alkali may not be needed. An alkaline pH is needed in the reaction mixture, but the amount of alkali added is variable.

As mentioned above, the starting material for the preparation is a conventional yellow iron oxide pigment (α-FeOOH). The soluble ferric salt added to the aqueous slurry of the iron oxide is exemplified by ferric sulfate, although other ferric salts that are soluble in water, such as ferric chloride, ferric nitrate, ferric oxalate, and ferric thiocyanate can be used. Since enough hydroxide ions are desired to keep the aluminum salt soluble, the carbonates of sodium and potassium can also be used. If there are no adverse reactions to form unwanted precipitates, ammonium hydroxide and calcium hydroxide can also be used as sources of OH ions. A soluble aluminum compound, for example, an alkali metal aluminate such as sodium aluminate, is conveniently prepared by mixing and dissolving aluminum oxide in sufficient sodium hydroxide. Potassium aluminate, aluminum chloride, potash alum, and aluminum nitrate are other examples of aluminum salts that are alkali- and water-soluble.

Since the soluble aluminum compound furnishes the ion that forms a portion of the (FeAl)OOH contained in the iron oxide, the amount of soluble compound added is more than 20 wt. %, based on the amount of the soluble ferric salt added.

A soluble alkali metal silicate can be added to the slurry, prior to the first hydrothermal treatment. Soluble salts such as sodium or potassium silicate can be used. These silicate compounds are useful in suppressing the change from α-FeOOH to α-Fe$_2$O$_3$. The amount added can vary from about 0.3 to about 5.0 wt. %, based on the aluminum of the soluble aluminum compound.

The hydrothermal treatments used in this preparation comprise heating the reactant mixture under autogenous pressure, using apparatus such as an autoclave. The temperature of the first treatment is in the range of from about 100° C. to about 240° C. Since the transition temperature of goethite (to hematite) is about 250° C., it is desirable that the temperature of the first treatment not exceed this transition temperature. The first treatment forms an AlOOH-containing iron oxide, such as [α-FeOOH-α-AlOOH], which appears to increase the stability of the yellow iron oxide pigment. Subsequent hydrothermal treatment, such as from about 250° C. to about 350° C., further improves the heat stability. The treatment periods for each hydrothermal treatment are not critical or precise, but experience has shown that a minimum time is at least 30 minutes, while a time of up to 10 hours is applicable. The usual treatment is about 1 to 5 hours.

Although the pH of the slurry for the first hydrothermal treatment is quite alkaline (>10), it is a part of the invention that, after the first hydrothermal treatment, the treated iron oxide be separated from the residual mother liquor. The treated pigment is then dispersed in water and again subjected to a hydrothermal treatment, at a higher temperature. The product from this second treatment then has a heat stability temperature much higher than that of either the original conventional yellow iron oxide pigment used as starting material or the product of the first hydrothermal treatment.

In another aspect of the invention, as mentioned above, if a yellow iron oxide previously subjected to a hydrothermal treatment, as disclosed in Japanese Patent Publication No. 28158/1978 or in the Japanese Patent Laying Open No. 34827/1978, is used as the starting material in the preparation, the heat resistance is increased by an addition effect, since the starting substrate iron oxide already has an elevated heat stability. Thus, a previously-treated yellow iron oxide can be used in the preparation and is immediately subjected to a hydrothermal treatment at a higher temperature, similar to the second hydrothermal treatment of the present invention. Broadly, this pretreatment involves slurrying from about 30 to about 200 parts of yellow iron oxide in about 1000 parts of an alkali solution, such as 0.5–3 N NaOH solution. This slurry is thermally hydrotreated for from about 2 to about 4 hours in the temperature range of from about 150° C. to about 230° C.

In one embodiment of the preparation of a heat-stable yellow iron oxide pigment, where yellow iron oxide, a soluble ferric salt, and an alkali metal aluminate are mixed as a slurry, the ranges of the parts of these three reactants can be varied as shown:

Yellow iron oxide - less than about 400 parts, with a preferred range of about 30 parts to about 200 parts, based on 1000 parts water.

Soluble iron salt - (such as ferric sulfate) - less than about 450 parts, with a preferred range of about 1 to about 100 parts, based on 1000 parts water.

The Al$_2$O$_3$ equivalent of the alkali metal aluminate (such as sodium aluminate), less than 200 parts, with a preferred range of about 20 to about 100 parts, based on 1000 parts water.

After a slurry such as that described above has been subjected to a hydrothermal (autoclave) treatment, the treated mixture is separated into solid and liquid components, and the solid phase is slurried again in water, such as from about 30 to about 200 parts of solids per 1000 parts of water.

The invention is further explained below, with reference to several Examples.

EXAMPLE 1

20 g of conventional commercial yellow iron oxide (Mapico Yellow LL-XLO, from Columbian Chemicals Co.) were dispersed in 500 ml of aqueous solution of ferric sulfate having a concentration of 27 g/l, based on Fe$_2$(SO$_4$)$_3$. To this solution, 145 ml of aqueous solution of sodium aluminate having a concentration of 291 g/l, calculated on the basis of Al$_2$O$_3$, and 5 ml of aqueous solution of sodium silicate of a concentration of 20 g/l, calculated on the basis of SiO$_2$, were added. After mixing, the so-obtained mixture was charged to an autoclave for a hydrothermal treatment at 200° C., for 3 hours, in order to form a yellow iron oxide containing AlOOH in the form of a solid solution, this composition having a heat resistance superior to the starting yellow oxide. After cooling, the contents of the autoclave were discharged, and the treated yellow iron oxide having AlOOH as solid solution was separated from the mother liquor, to remove residual and excess alkali. The separated AlOOH-containing yellow iron oxide was then dispersed in water, and the dispersion was charged into an autoclave again and was subjected to a further hydrothermal treatment at 290° C. for 5 hours.

Figure 1B:
Figure 2A:
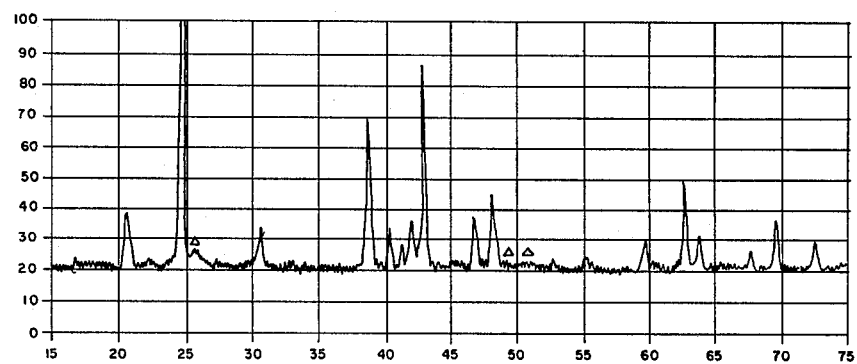
FIGS. 2a and 2b are X-ray diffraction patterns for the AlOOH-containing yellow iron oxide treated by the method according to the present invention (FIG. 2a) and for the starting conventional yellow iron oxide (FIG. 2b) respectively.
Figure 2B:
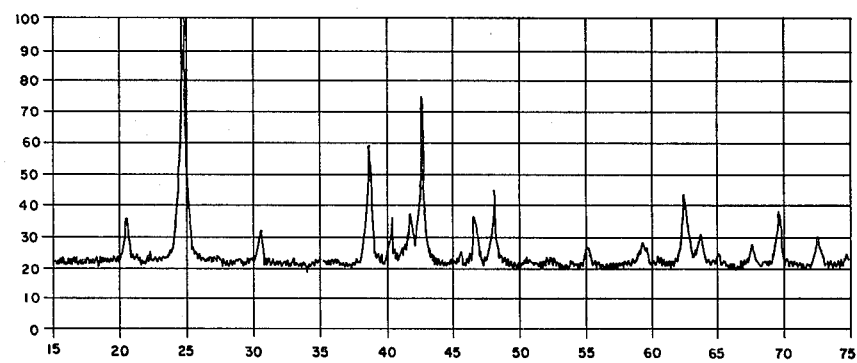

After filtering, washing, drying and crushing, a product was obtained, an electron microscope photograph of which is shown in FIG. 1a. This product shows the needle-like crystal form characteristic of goethite, similar to that of commercial yellow iron oxide shown in FIG. 1b. In the X-ray diffraction pattern shown in FIG. 2a, no indication of diffraction peaks for hematite caused by the decomposition of goethite is noted. FIG. 2b is the diffraction pattern for the starting conventional yellow iron oxide.

Using the AlOOH-containing yellow iron oxide pigment and a silicone resin SH-806A, a product of the firm Toray Silicone, a coating composition was formulated with the following composition:

| | |
|---|---|
| Yellow iron oxide | 8 g |
| Silicone resin | 24 g |
| Glass beads (GB 503 of Bridgestone Glassbeads Ltd.) | 40 g |

The composition was prepared by shaking this mixture in a paint conditioned of the firm Red Devil Co. for 20 minutes. This coating composition was coated on an aluminum foil (thickness of 0.1 mm), using a barcoater, before it was baked at various temperatures, excepting that panels of 150° were baked for 30 minutes. Each baked panel was measured using a Color and Color-Difference Meter of NIHONDENSHOKU (ND-101 DC). The results were expressed by Hunter L, a, and b units. The measurements for the panel baked at 150° C. were used as the reference values for the total color difference ($\Delta E = \sqrt{\Delta L^2 + \Delta a^2 + \Delta b^2}$) for each baking temperature. A smaller $\Delta E$ corresponds to a lesser color change and, thus, to a better thermal stability.

In Table I, the data for Hunter L, a, and b, as well as for $\Delta E$, are given, in which (1) indicates results using commercial yellow iron oxide, (2) results for the AlOOH-containing yellow iron oxide obtained by a hydrothermal treatment at 200° C. for 3 hours, and (3) results for the yellow iron oxide containing AlOOH treated by the method according to the present invention.

We decided that the heat stability of a pigment can be represented when the temperature at which the color difference, $\Delta E$, with respect to the color for 150° C. baking, reaches a value of 1.5. This heat stability temperature was determined to be 203° C. for the commercial yellow iron oxide (1), 250° C. for the AlOOH-containing yellow iron oxide (2), and 270° C. for the AlOOH-containing yellow iron oxide treated by the method according to the present invention (3).

Therefore, the AlOOH-containing yellow iron oxide treated by the method according to the present invention shows an improvement in the heat resistance temperature of 67° C. when compared with the conventional yellow iron oxide, and it surpasses also the AlOOH-containing yellow iron oxide obtained from the hydrothermal treatment at 200° C. for 3 hours by a magnitude of 20° C.

COMPARISON EXAMPLE 1

The procedure of Example 1 was repeated, with the exception that the AlOOH-containing yellow iron oxide obtained after the hydrothermal treatment at 200° C. for 3 hours was then subjected directly to the second hydrothermal treatment at 290° C. for 1 hour, without the separation from the mother liquor. The product obtained consisted of red-colored α-iron oxide. The difference in this product from the product of Example 1 confirms the desirability of separating the solid phase from the liquid phase that contains excess alkali.

EXAMPLE 2

The procedure of Example 1 was followed with the difference that a pretreated yellow iron oxide, obtained by subjecting conventional yellow iron oxide to a hydrothermal treatment at 190° C. for 3 hours in 1 N aqueous NaOH solution, was employed for the starting yellow iron oxide. The pretreated oxide was processed, after the hydrothermal treatment, by filtration and washing of the solid product.

The results of the evaluation of heat resistance of the so-obtained AlOOH-containing yellow iron oxide are given in Table II, from which it is recognizable that the heat resistance temperature at which $\Delta E$ reaches the value of 1.5 lies at 279° C., corresponding to an improvement of heat resistance of 9° C. compared with that obtained in Example 1.

In the pretreatment step, the amount of yellow iron oxide slurried varies from about 30 to 200 parts of oxide per 1000 parts water or alkaline solution. The aqueous alkaline solution is typically formed from an alkali metal hydroxide. The concentration can vary from about 0.5 N to about 3 N, and NaOH is a commonly-used alkali metal hydroxide.

TABLE I

| Pigment used | Panel baked at 150° C., 30 min. | | | | Panel baked at 200° C., 15 min. | | | | Panel baked at 220° C., 15 min | | | |
|---|---|---|---|---|---|---|---|---|---|---|---|---|
| | L | a | b | $\Delta E$ | L | a | b | $\Delta E$ | L | a | b | $\Delta E$ |
| (1) | 51.5 | 6.3 | 30.2 | | 50.3 | 7.1 | 29.5 | 1.28 | 48.8 | 8.3 | 18.4 | 3.48 |
| (2) | 51.4 | 6.7 | 31.0 | | 51.3 | 6.7 | 30.9 | 0.14 | 51.2 | 6.7 | 30.7 | 0.35 |
| (3) | 51.3 | 7.0 | 31.0 | | 51.3 | 6.7 | 31.0 | 0.37 | 51.3 | 6.7 | 30.9 | 0.39 |

| Pigment used | Panel baked at 240° C., 15 min. | | | | Panel baked at 260° C., 15 min. | | | | Panel baked at 280° C., 15 min. | | | |
|---|---|---|---|---|---|---|---|---|---|---|---|---|
| | L | a | b | $\Delta E$ | L | a | b | $\Delta E$ | L | a | b | $\Delta E$ |
| (1) | 42.9 | 11.9 | 24.4 | 11.49 | 32.1 | 18.4 | 17.7 | 25.74 | 28.6 | 19.7 | 15.5 | 29.99 |
| (2) | 50.8 | 6.7 | 30.5 | 0.75 | 49.3 | 8.1 | 29.5 | 2.94 | 45.1 | 11.9 | 26.5 | 9.32 |
| (3) | 51.1 | 6.7 | 30.8 | 0.48 | 50.6 | 7.1 | 30.5 | 0.88 | 49.4 | 8.2 | 29.7 | 2.63 |

TABLE II

| Panel baked at 150° C., 30 min. | | | | Panel baked at 200° C., 15 min. | | | | Panel baked at 220° C., 15 min. | | | |
| --- | --- | --- | --- | --- | --- | --- | --- | --- | --- | --- | --- |
| L | a | b | ΔE | L | a | b | ΔE | L | a | b | ΔE |
| 49.9 | 7.5 | 30.5 | | 49.9 | 7.5 | 30.4 | 0.10 | 49.9 | 7.8 | 30.4 | 0.32 |

| Panel baked at 240° C., 30 min. | | | | Panel baked at 260° C., 15 min. | | | | Panel baked at 280° C., 15 min. | | | |
| --- | --- | --- | --- | --- | --- | --- | --- | --- | --- | --- | --- |
| L | a | b | ΔE | L | a | b | ΔE | L | a | b | ΔE |
| 49.8 | 7.8 | 30.5 | 0.37 | 49.1 | 7.8 | 30.3 | 0.88 | 48.7 | 8.2 | 29.7 | 1.60 |

The embodiments of the invention in which an exclusive property or privilege is claimed are defined as follows:

1. The preparation of a yellow iron oxide pigment having improved heat stability, comprising the steps of
   (a) forming an aqueous slurry of from about 30 to about 200 parts yellow iron oxide (α-FeOOH), from about 1 to about 100 parts a soluble ferric salt, selected from the group consisting of ferric sulfate, ferric chloride, ferric nitrate, ferric oxalate, and ferric thiocyanate, an alkali metal hydroxide in an amount to provide the slurry with a pH of greater than 10, and from about 20 to about 100 parts of a water-soluble or alkali-soluble aluminum compound, selected from the group consisting of sodium aluminate, potassium aluminate, aluminum chloride, potash alum, and aluminum nitrate, all based on 1000 parts water,
   (b) subjecting the resultant mixture to a first hydrothermal treatment carried out at a temperature of from about 100° C. to about 240° C. for a time greater than 30 minutes,
   (c) separating the treated mixture into a first solid phase and a first liquid phase,
   (d) dispersing the first solid phase of step (c) in water,
   (e) subjecting the first solid phase to a second hydrothermal treatment at a temperature of at least 250° C. to about 350° C. for a time greater than 30 minutes,
   (f) separating the treated mixture into a second solid phase and a second liquid phase, and
   (g) recovering the second solid phase and processing said phase to give a treated yellow iron pigment having an improved heat stability.

2. The preparation of claim 1, wherein
   (a) the soluble ferric salt is ferric sulfate,
   (b) the alkali metal hydroxide is sodium hydroxide,
   (c) the soluble aluminum compound is an alkali metal aluminate,
   (d) from about 0.3–5.0 wt. %, based on the aluminum of the aluminum compound of a soluble alkali metal silicate is added to the mixture prior to the first hydrothermal treatment, and
   (e) the slurry of claim 1 step (a) has the approximate composition of from about 30 to about 200 parts of solid phase for 1000 parts water.

3. The preparation of claim 2, wherein
   (a) the time of the first hydrothermal treatment is from about ½ to about 4 hours,
   (b) the amount of soluble aluminum compound added is more than 20 wt. %, based on the soluble ferric salt, and
   (c) the time of the second hydrothermal treatment is from about ½ to about 10 hours.

4. The preparation of a yellow iron oxide pigment having improved heat stability, comprising the steps of
   (a) forming an aqueous slurry of a treated yellow iron oxide pigment that has been previously subjected to the treatment steps of
      1. forming an aqueous slurry of yellow iron oxide (α-FeOOH), and sodium hydroxide,
      2. subjecting the resultant slurry to a hydrothermal treatment at a temperature of from about 100° C. to about 240° C. for a period of between about ½ hour and about 5 hours, and
      3. separating the treated mixture into a solid phase and a liquid phase, with the solid phase being further processed to form the slurry of the pretreated yellow iron oxide,
   (b) adding to a slurry of from about 30 to about 200 parts of the pretreated yellow iron oxide based on 1000 parts water, from about 1 to about 100 parts of a soluble ferric salt, selected from the group consisting of ferric sulfate, ferric chloride, ferric nitrate, ferric oxalate, and ferric thiocyanate, an amount of alkali metal hydroxide to provide the slurry with a pH of greater than 10 and from about 20 to 100 parts of a water-soluble or alkali-soluble aluminum compound, selected from the group consisting of sodium aluminate, potassium aluminate, aluminum chloride, potassium alum, and aluminum nitrate, all based on 1000 parts water,
   (c) subjecting the slurry mixture to a first hydrothermal treatment at a temperature of from about 100° C. to about 240° C. for a time greater than 30 minutes,
   (d) separating the treated mixture into a solid phase and a liquid phase,
   (e) dispersing the solid phase in water,
   (f) subjecting the resultant slurry to a second hydrothermal treatment, and at a temperature of at least 250° C. to about 350° C. for a longer than 30 minutes, and
   (g) recovering the solid phase from the treatment and processing said phase to give a product having a heat stability temperature higher than the heat stability temperature of the treated iron oxide of step (a).

5. The preparation of claim 4, wherein
   (a) the normality of the aqueous slurry for the previous-treatment step (a)1, is about 1 N NaOH, and the composition is approximately 30 to 200 parts yellow iron oxide per liter of alkaline solution,
   (b) the temperature of the previous-treatment hydrothermal treatment is in the range of about 150°–230° C., and the time is about 2 to 4 hours,
   (c) in step (b), the soluble ferric salt is ferric sulfate, the alkali metal hydroxide is sodium hydroxide, and the aluminum compound is sodium aluminate, and
   (d) from about 0.3–5.0 wt. %, based on the aluminum of the aluminum compound of a soluble alkali metal silicate is added to the mixture prior to the first hydrothermal treatment.

6. The preparation of claim 5, wherein
(a) the time of the first hydrothermal treatment is from about ½ to about 4 hours,
(b) the amount of soluble aluminum compound added is more than about 20 wt. %, based on the soluble ferric salt,
(c) the time of the second treatment is from about ½ to about 5 hours.

* * * * *